US006751992B1

(12) United States Patent
Esquilin

(10) Patent No.: US 6,751,992 B1
(45) Date of Patent: Jun. 22, 2004

(54) BICYCLE MOUNTED LOCKING SYSTEM FOR THEFT PREVENTION

(76) Inventor: Pablo Esquilin, 6404 68th Ave., Glendale, NY (US) 11385

( * ) Notice: Subject to any disclaimer, the term of this patent is extended or adjusted under 35 U.S.C. 154(b) by 0 days.

(21) Appl. No.: 10/279,295

(22) Filed: Oct. 24, 2002

(51) Int. Cl.[7] .............................. B62H 5/00; E05B 71/00
(52) U.S. Cl. ............................... 70/233; 70/227; 70/234
(58) Field of Search ........................... 70/233, 225–227, 70/234–236, 62; 211/5

(56) References Cited

U.S. PATENT DOCUMENTS

| | | | | |
|---|---|---|---|---|
| 524,527 | A | * 8/1894 | Hall ........................ | 188/24.11 |
| 1,507,069 | A | 9/1924 | Klaila | |
| 3,788,108 | A | 1/1974 | Norcross | |
| 3,832,871 | A | * 9/1974 | Kaufmann ................. | 70/227 |
| 3,918,279 | A | * 11/1975 | Williamson ................ | 70/234 |
| 3,934,436 | A | * 1/1976 | Candlin et al. ............ | 70/234 |
| 3,944,079 | A | * 3/1976 | Boslough .................. | 211/5 |
| 3,996,775 | A | * 12/1976 | Waldron .................... | 70/234 |
| 4,086,795 | A | * 5/1978 | Foster et al. .............. | 70/233 |
| 4,232,537 | A | * 11/1980 | Plaiss ........................ | 70/233 |
| 4,459,833 | A | 7/1984 | Waterkamp et al. | |
| 4,490,997 | A | * 1/1985 | Hughes et al. ............. | 70/233 |
| 4,571,965 | A | * 2/1986 | LeRoux ..................... | 70/227 |
| 4,708,004 | A | * 11/1987 | Allen ........................ | 70/226 |
| 4,776,188 | A | * 10/1988 | Dalaba et al. ............. | 70/49 |
| 4,945,739 | A | 8/1990 | Prindle | |
| 5,197,310 | A | * 3/1993 | Pedersen ................... | 70/227 |
| 5,408,212 | A | * 4/1995 | Meyers et al. ............. | 340/427 |
| 5,706,679 | A | * 1/1998 | Zane et al. ................. | 70/18 |
| 5,709,113 | A | 1/1998 | Godfrey | |
| 5,743,411 | A | * 4/1998 | Hawkes ..................... | 211/20 |
| 5,802,889 | A | * 9/1998 | Arnold ...................... | 70/18 |
| 5,887,461 | A | * 3/1999 | Heffley ..................... | 70/18 |
| 5,937,678 | A | * 8/1999 | Kuo .......................... | 70/18 |
| 6,505,846 | B1 | * 1/2003 | Hoffman ................... | 280/274 |
| 6,513,355 | B1 | * 2/2003 | Lin ........................... | 70/209 |

* cited by examiner

Primary Examiner—John B. Walsh
(74) Attorney, Agent, or Firm—Howard Natter Natter & Natter

(57) ABSTRACT

A bicycle mounted locking system for theft prevention includes a carrier member attachable to a bicycle frame member. A swingable arm extendable from the carrier member provides for tethered anchorage to a stationary object. A swivel stirrup depending from the carrier member is engageable with a bicycle wheel for providing wheel rotational blockage and securement.

10 Claims, 3 Drawing Sheets

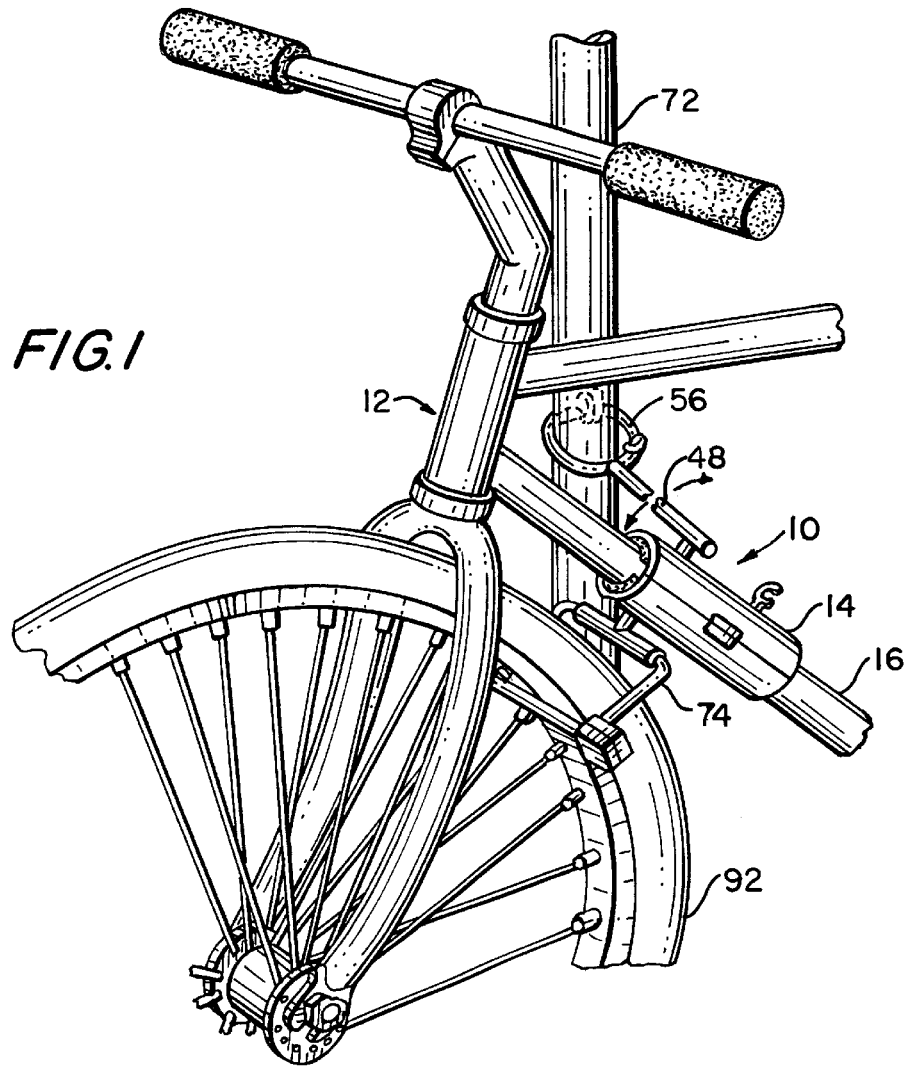
FIG.1
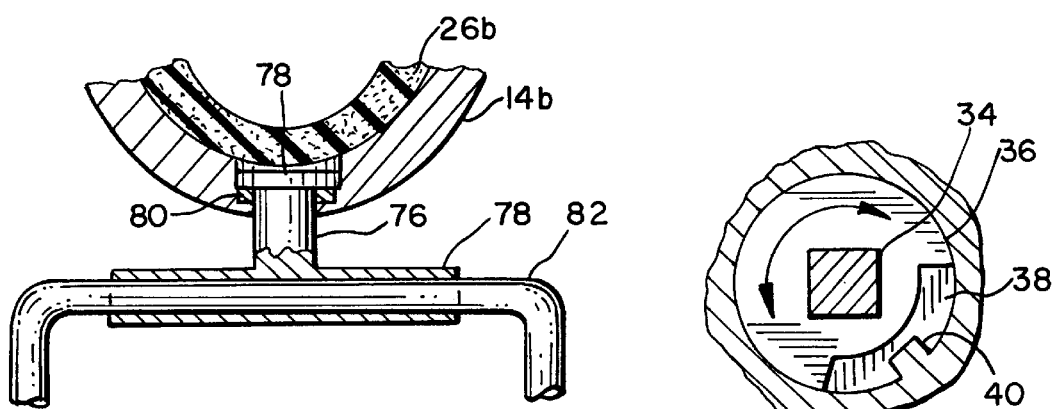
FIG.4
FIG.8

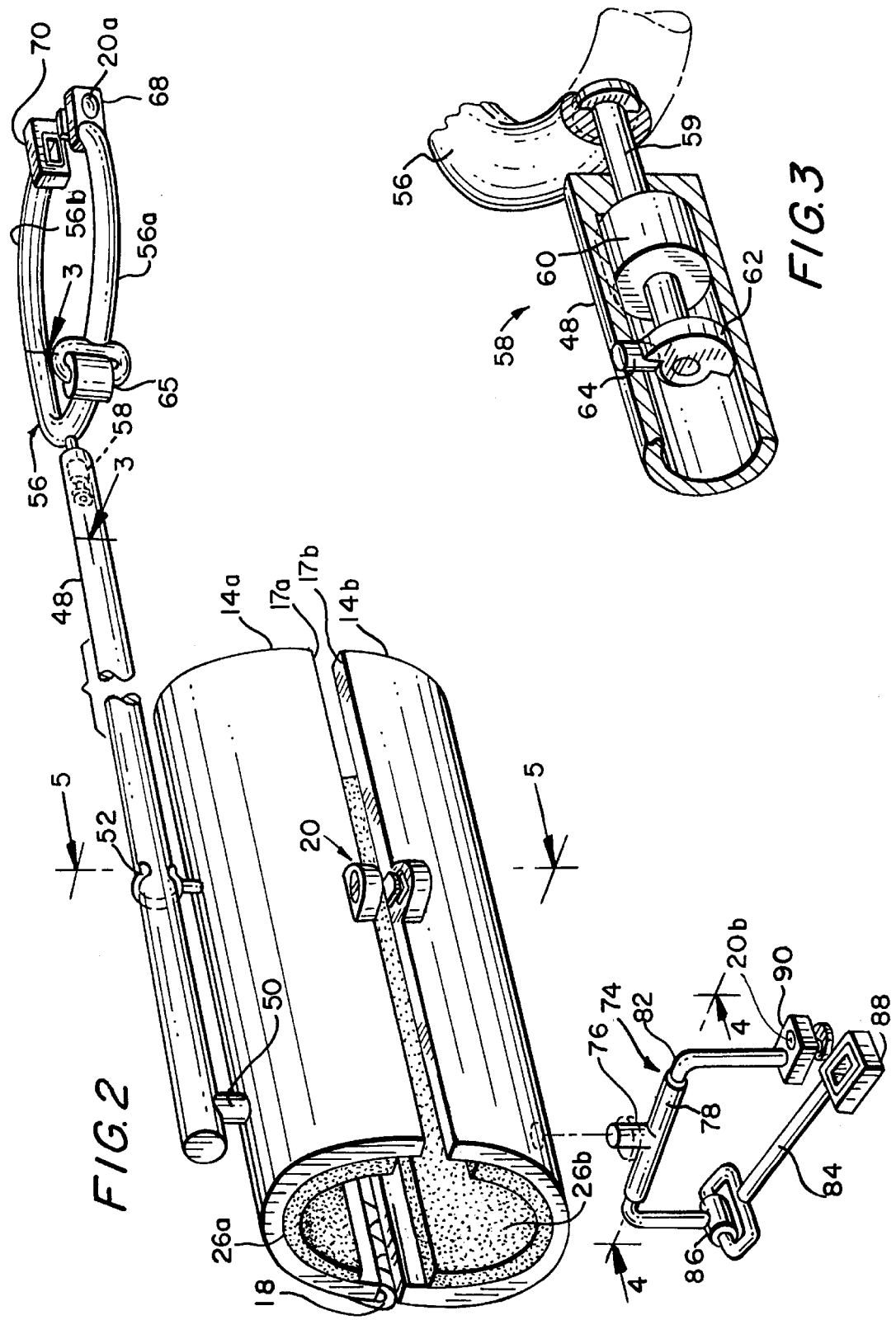

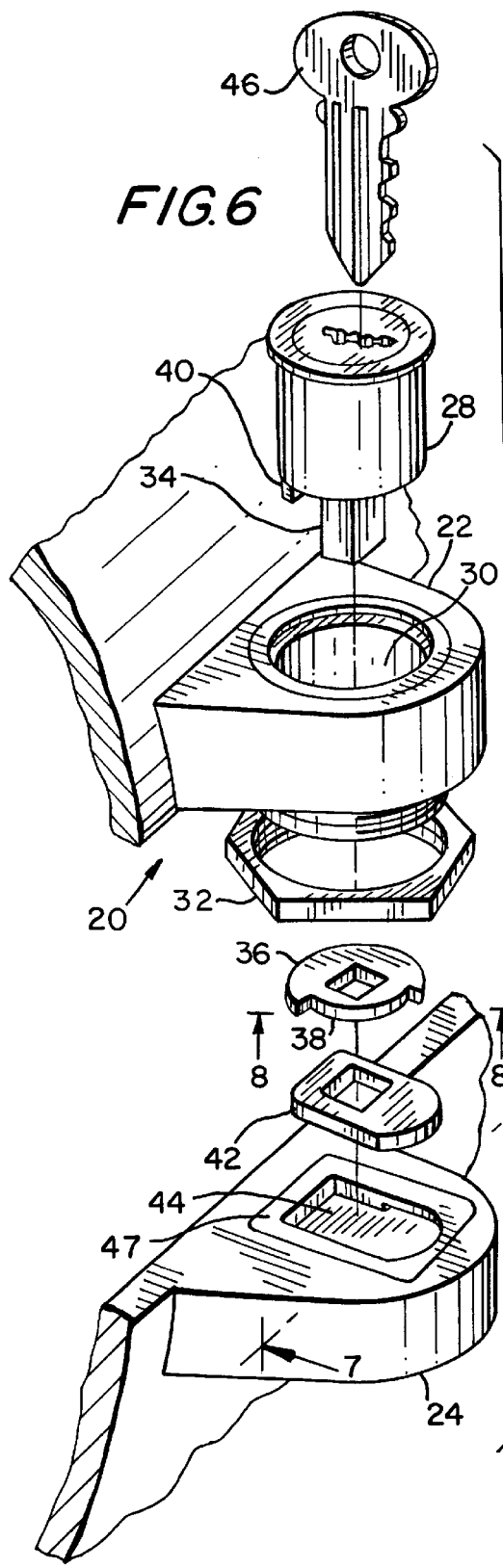
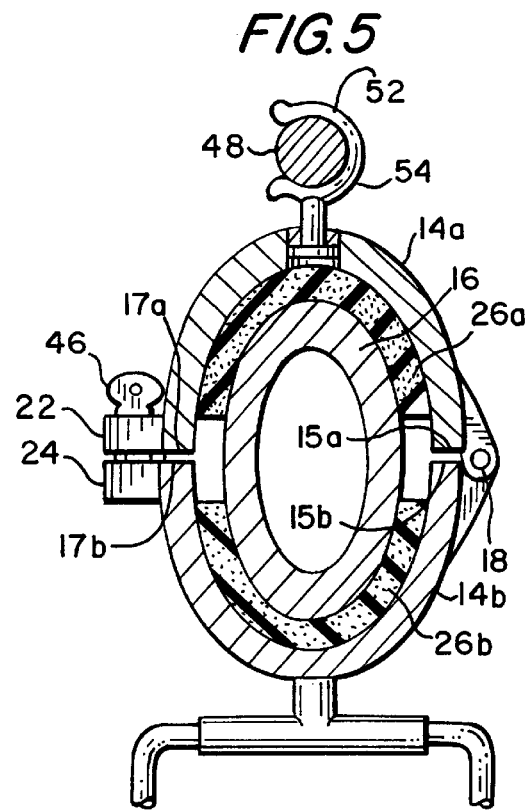
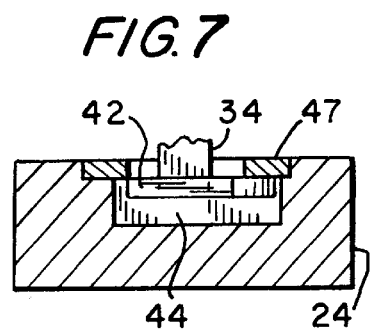

BICYCLE MOUNTED LOCKING SYSTEM FOR THEFT PREVENTION

BACKGROUND OF THE INVENTION

1. Field of the Invention

This invention relates generally to security devices and especially to locking devices for cycles and the like.

In particular, the locking system of this invention concerns a device for providing a bicycle with tethered anchorage and wheel rotation blockage.

2. Related Art

Bicycle larceny/theft in the United States has become a serious problem and is especially prevalent in larger cities and on college campuses. Commonly used theft deterrents, such as cable locks and chains with padlocks, are relatively easy targets for thieves using bolt cutters and similar tools. Another shortcoming of these locking devices is the tendency to scratch or mar the finish of the bicycle frame during usage and when self-carried, to vibrate when the bike is in motion.

Another type of locking arrangement, such as shown in U.S. Pat. No. 5,709,113 relies upon a U-shaped shackle. A disadvantage of these locks is that the locking mechanism is readily subject to failure when a mechanical force is generated through use of a pipe/lever or an automobile jack. A further limitation of the U-shaped lock device is that the bicycle must be positioned in close proximity to a stationary object to which it is secured.

Still a further deficiency of prior bike lock devices is that they did not separately secure the front wheel and the wheel could, in some instances, be separately removed from a bicycle locked to a bike-rack or stanchion.

Another species of locking device is the wheel spoke-gap traversing lock, such as shown in U.S. Pat. Nos. 4,945,739, 4,459,833 and 3,788,108. A problem with these locking devices is that the bicycle is not always constrained to a fixed object and thus would not prevent the bicycle from being physically removed.

BRIEF SUMMARY OF THE INVENTION

The nature of this invention concerns a bicycle locking system for theft prevention that is not subject to the limitations of the previously extant devices.

The locking system of this invention includes a carrier member adapted for attachment to a bicycle frame member. A swingable anchor arm is mounted, at one end, to an upper portion of the carrier member; a collar member is provided at an opposite end of the anchor arm. The collar member is hingedly operable for lockable securement to an immovable object. A swivel stirrup depending from a lower portion of the carrier member is proximately located for lockable engagement with a wheel of the bicycle for securing the wheel to the bicycle frame as well as for blocking wheel rotation. The carrier member includes removable spacer elements for accommodation with different size bicycle frame members.

A feature of this invention is that it provides a dual locking system. Another aspect of this invention is that it provides an arrangement of multi-positionable articulated members.

Having thus summarized the invention, it will be seen that it is a preferred object thereof to provide a bicycle mounted locking system for theft prevention which is not subject to the aforementioned limitations.

Another preferred object of this invention is to provide a bicycle mounted locking system providing for tethered anchorage of the bicycle and securement of the front wheel.

A still further preferred object of this invention is to provide a bicycle mounted locking system that is key operated.

Yet another preferred object of this invention is to provide a bicycle mounted locking system that can be selectively attached to a bicycle frame.

A still further preferred object of this invention is to provide a bicycle mounted locking system that is adaptable for use with a range of different-size bicycle frame members.

Still yet another preferred object of this invention is to provide a bicycle mounted locking system that is practical in use, reliable in operation, simple in design, and economical to manufacture.

With these ends in view, the invention finds embodiment in certain combinations of elements and arrangements of parts by which the aforementioned preferred objects and certain other objects are hereinafter attained all as more fully described with reference to the accompanying drawings and the scope of which is more particularly pointed out and indicated in the appended claims.

BRIEF DESCRIPTION OF THE DRAWINGS

In the accompanying drawings in which is shown an exemplary embodiment of the invention:

FIG. 1 is a perspective view showing a portion of a bicycle secured to a post with a wheel locked against rotation utilizing the bicycle mounted locking system of this invention;

FIG. 2 is an isolated perspective view of the locking system of this invention illustrating a carrier member, a swingable anchor arm supporting a collar member, and a swivel stirrup;

FIG. 3 is an isolated perspective view partially in section, showing a collar member juncture to the anchor arm;

FIG. 4 is an isolated perspective view to an enlarged scale taken substantially along line 4—4 of FIG. 2 showing a connection of the stirrup member to the carrier member;

FIG. 5 is the sectional view taken substantially along line 5—5 of FIG. 2 showing the carrier member secured to a bicycle frame member;

FIG. 6 is an exploded view in perspective showing in detail a lock assembly utilized in this invention;

FIG. 7 is a sectional view taken substantially along line 7—7 of FIG. 6 illustrating a lock seating arrangement; and FIG. 8 is an auxiliary view taken substantially along line 8—8 of FIG. 6 showing a lock washer and a stop member for limiting rotational displacement.

DETAILED DESCRIPTION OF THE INVENTION

With specific reference now to the figures in detail, it is stressed that the particulars shown are by way of example and for the purpose of illustrative discussion of the preferred embodiment of the present invention only and are presented in the cause of providing what is believed to be the most useful and readily understood description of the principles and conceptual aspects of the invention. In this regard, no attempt is made to show structural aspects of the invention in more detail than is necessary for a fundamental understanding of the invention, the description taken with the drawings making apparent to those skilled in the art how the invention may be embodied in practice.

Referring now to the drawings, the reference numeral 10 denotes generally a bicycle mounted locking system in accordance with this invention. The locking system 10 is intended for use as an auxiliary, anti-theft attachment, for bicycles however, it can also be incorporated as original manufacturer equipment. Although the invention will be described with reference to use with a bicycle, it should be apparent that the locking system 10 could also find application with motorized cycles and similar vehicles.

With regard to this exemplary embodiment, FIG. 1 shows a partial perspective view of a bicycle 12, secured with the locking system 10. The locking system 10 includes a carrier member 14 adapted for attachment to the bicycle 12 and preferably for mounting to a downtube 16 as shown in FIG. 1. The carrier member 14 is in the form of a cylindrical sleeve and is constructed in two half-sections forming segments 14*a*, 14*b*, which, in this preferred embodiment, are connected by a hinge 18 running along one set of confronting edges 15*a*, 15*b*. A lock assembly 20 is mounted, along an opposite set of confronting edges 17*a*, 17*b*, within a lock housing 22 that is in registration with a lock keeper 24.

The carrier member 14 is adapted to be attached to the downtube 16 and to be securely held in position. In order to accommodate a range of different downtube configurations and to provide substantially vibration-free securement, a set of spacer elements 26*a*, 26*b* are employed. The spacer elements 26*a*, 26*b* are yieldably deformable to conform to the contour of the segments 14*a*, 14*b* and for that purpose, are made of a compressible "foam" or elastomeric material. The illustrated carrier member 14 has an oval cross-sectional configuration. Alternative spacer elements 26*a*, 26*b* of various selected sizes and shapes may be used as needed for providing snug engagement with the downtube 16 as, for example, is shown in FIG. 5 or with other downtube configurations.

The lock assembly 20 will now be described with reference to FIG. 6. A lock plug 28 is mounted in a cylinder recess 30 in the lock housing 22 and is secured therein by a threaded lock nut 32. The lock plug 28 contains a tailpiece 34 for receiving a lock washer 36. The lock washer 36 includes a notched portion 38 that contacts a stop member 40 to define the limit of rotational displacement of the plug 28. A tongue 42 is affixed to the tailpiece 34 for rotation with the lock washer 36, the tongue 42 is registrable with a recess 44 in a strike plate 47. The lock plug 28 may be rotated with a key member 46 for displacing the lock tongue 42, within the defined limits of the rotational displacement (illustrated by arrows), to a locked position below the overlying strike plate 47, as shown in FIGS. 7 and 8.

Referring once again to FIG. 2, the anchor arm 48 is attached at a proximal end by a pivot connection 50, to the carrier segment 14*a*. The anchor arm 48 may be swingably displaceable about the connection 50 (as illustrated by the arrows in FIG. 1), and may be retained, when not in use, by engagement with a clamp member 52 as shown in FIG. 2. The clamp member 52 includes a curved spring clip 54 for releasably holding the anchor arm 48.

A collar member 56 is provided at a distal end of the anchor arm 48. The collar member 56 is connected to the anchor arm by a connector assembly 58. The connector assembly 58 includes a connector shaft 59, fixedly secured, at one end to the collar member 56. A guide plug 60 and a cam 62 are secured to the opposite end of the shaft 59 for rotational movement within the anchor arm 48 as the collar 56 is displaced. A pin 64 projecting internally within the anchor arm 48 co-acts with the cam 62 to limit displacement of the collar member 56, preferably within a range of approximately 180°. The collar member 56 is positionable within a first plane when in operational locked mode and is rotatable about a longitudinal axis of the anchor arm 48 to a second plane when engaged with the spring clip 52.

The collar member 56 has two linked sections 56*a*, 56*b* connected by a yoke member 65. The free ends of sections 56*a*, 56*b* are relatively displaceable and respectively include a lock housing 68 and a lock keeper 70, for accommodating a lock assembly 20*a* substantial identical the lock assembly 20. In use, it should be apparent that the collar sections 56*a*, 56*b* will be displaced about the connector assembly 58 and/or the yoke member 65 for engaging a stationary object such as a post 72. The length of the anchor arm 48 is of sufficient length such that the bicycle 12 need only be remotely located with respect to the post 72 for tethered anchorage. Furthermore, although, not shown, it should to be apparent that the anchor arm 48 can have an adjustable length e.g. it can be made telescopically extendable.

Referring once again to FIG. 2 there is shown a stirrup member 74. The stirrup member 74 is secured to the carrier segment 14*b* by a neck member 76 recess mounted within the carrier segment 14*b*. A bushing 80 facilitates rotational displacement of the neck member 76. An elongate tabular shoulder portion 78 is adapted for receiving a hanger member 82. The hanger member 82 is journalled through the shoulder member 78 as shown in FIG. 4. One leg of the hanger member 82 is linked to a lock bar 84 by a yoke member 86. The free end of the lock bar 84 contains a lock keeper 88. Another leg of the shoulder member 82 includes a lock housing 90 for accommodating a lock assembly 20*b* substantially identical to lock assembly 20. The stirrup member 74 is used for rotational blockage of a front wheel 92 of the bicycle 12 as shown in FIG. 1 and to prevent removal of the wheel 92. Alternatively, the stirrup member 74 can be releasably secured to the carrier 14*b* and optionally used for securement of a rear wheel.

It should be understood that the several lock assemblies 20, 20*a*, 20*b* are preferably operable using a single key. Alternatively, a magnetic-key lock may be substituted and/or a card key or combination lock may be used in place of the key lock. The locking system 10 is preferably fabricated from high performance chrome-nickel alloy, harden steel, or similar durable materials that can withstand most theft attempts.

It should thus be seem that there is provided a bicycle mounted locking system for theft prevention which achieves the various preferred objects of this invention and which is well adapted to meet conditions of practical use.

Since various possible embodiments might be made of the present invention or modifications might be made to the exemplary embodiments set forth, it is to be understood that all materials shown and described in the accompanying drawings are to be interpreted as illustrative and not in a limiting sense.

Having thus described the invention, there is claimed as new and desired to be secured by Letters Patent:

1. A bicycle locking system for providing tethered securement to an immovable object comprising a carrier member attachable to a bicycle frame member, said carrier member including an anchor arm pivotally attached to the carrier member and extendable from the carrier member, said anchor arm including a collar member, said collar member being adapted for lockable engagement with the immovable object, said carrier member further including a stirrup member, said stirrup member being lockingly positionable around a wheel of the bicycle to block wheel rotation and to prevent unauthorized removal of the wheel.

2. A bicycle locking system as claimed in claim 1 further including a swivel connector between the stirrup member and the carrier member, said swivel connector including a neck portion, said neck portion being rotatably mounted to the carrier member, a shoulder portion, said shoulder portion supporting a hanger member journalled through the shoulder portion, said hanger member being linked at one end to a lock bar, a free end of the lock bar and of the hanger member being adapted for accommodating respective components of a lock assembly for lockingly engaging the wheel.

3. A bicycle locking system as claimed as claim 2 wherein the lock bar is adapted for traversing a spoke gap of the wheel.

4. A bicycle locking system as claimed in claim 1 wherein the collar member includes linked components having respective free ends for accommodating a lock assembly, said lock assembly being adapted for selectively securing the collar member to the immovable object.

5. A bicycle locking system as claimed in claim 4 further including a connector assembly at a juncture of the anchor arm and the collar member, said connector assembly providing for rotational displacement of the collar member with respect to a longitudinal axis of the anchor arm.

6. A bicycle locking system as claimed in claim 5 wherein the rotational displacement is within a range of 180°.

7. A bicycle locking system as claimed in claim 5 wherein the connector assembly includes a connector shaft fixedly secured at one end to the collar member with an opposite end of the connector shaft extending within the anchor arm, said opposite end including a cam member for limiting rotational displacement of the collar member.

8. A bicycle locking system as claimed in claim 1 wherein the carrier member includes two hingedly connected sections, said sections being adapted for accommodating respective components of a lock assembly.

9. A bicycle locking system as claimed in claim 8 further including a spacer member accommodatable within the carrier member, said spacer member being yieldable for effectuating a snug engagement between the carrier member and the bicycle frame member.

10. A bicycle locking system for tethered securement to an immovable object remotely located with respect to the bicycle for preventing theft of the bicycle comprising a carrier member mounted to the bicycle frame, said carrier member including an anchor arm swingably extendable from the carrier member, said anchor arm supporting a collar member at an end thereof, said collar member being adapted for lockable engagement with the immovable object, further including a stirrup member depending from the carrier member, said stirrup member being positionable over a wheel of the bicycle including a lock bar adapted to transverse a wheel spoke gap when in a locked mode.

\* \* \* \* \*